United States Patent

Biro et al.

[11] Patent Number: 5,739,633
[45] Date of Patent: Apr. 14, 1998

[54] AMALGAM CONTAINING COMPACT FLUORESCENT LAMP WITH IMPROVED WARM-UP

[75] Inventors: Atilla Biro, Willoughby Hills, Ohio; Sandor Lukacs, Veroce; Edit Katona, Debrecen, both of Hungary; Helen Rapp, Cleveland Heights, Ohio

[73] Assignee: General Electric Company, Schenectady, N.Y.

[21] Appl. No.: 514,674

[22] Filed: Aug. 14, 1995

[51] Int. Cl.$^6$ .............................. H01J 1/62; H01J 63/04; H01J 17/20; H01J 61/20
[52] U.S. Cl. ..................... 313/490; 313/493; 313/639
[58] Field of Search .......................... 313/490, 491–493, 313/564, 565, 566, 571, 637, 638, 639, 545–47

[56] References Cited

U.S. PATENT DOCUMENTS

| | | |
|---|---|---|
| 3,336,502 | 8/1967 | Gilliatt . |
| 3,422,299 | 1/1969 | Morehead . |
| 3,858,075 | 12/1974 | Herrmann et al. . |
| 4,337,414 | 6/1982 | Young .................... 313/493 X |
| 4,347,460 | 8/1982 | Latassa et al. ............. 313/493 X |
| 4,539,508 | 9/1985 | Mulder et al. ............. 313/490 X |
| 4,546,285 | 10/1985 | Heuvelmans et al. ........ 313/490 X |
| 4,871,944 | 10/1989 | Skwirut et al. ............ 313/490 X |
| 5,055,738 | 10/1991 | Yorifuji et al. . |
| 5,095,336 | 3/1992 | Corona et al. . |
| 5,204,584 | 4/1993 | Ikeda et al. ............... 313/490 X |
| 5,294,867 | 3/1994 | Grossman . |

FOREIGN PATENT DOCUMENTS 1440025  6/1976  Germany .

Primary Examiner—Sandra L. O'Shea
Assistant Examiner—Mack Haynes
Attorney, Agent, or Firm—George E. Hawranko

[57] ABSTRACT

A compact fluorescent lamp having improved warm-up characteristics is provided. The lamp includes a sealed glass envelope formed from U-shaped tubes each having a pair of substantially parallel leg sections closed at one end and a transversely extending bridging section joining the other end of the leg sections. Adjacent leg sections of adjacent tubes are joined by connecting conduits which complete a convoluted and elongate discharge path between a pair of electrodes. A main amalgam located within in a sealed stem at a closed end of an interior leg section for controlling mercury vapor pressure during a discharge period except for a starting period thereof. Auxiliary amalgams are attached to electrode support structures extending from the closed ends of the exterior leg sections for emitting mercury vapor during the starting period. Furthermore, an additional auxiliary amalgam is attached to a support structure extending from a sealed stem at a closed end of an interior leg section and in the discharge path at a substantially equal distance from each of the electrodes for emitting mercury vapor during the starting period.

17 Claims, 1 Drawing Sheet

AMALGAM CONTAINING COMPACT FLUORESCENT LAMP WITH IMPROVED WARM-UP

BACKGROUND OF THE INVENTION

1. Field of the Invention

The present invention generally relates to a low-pressure mercury vapor discharge lamp having a main amalgam for controlling mercury vapor pressure during operation and auxiliary amalgam for controlling the mercury vapor pressure during a starting period and, more particularly, to such a lamp having improved warm-up characteristics.

2. Description of Related Art

In recent years there has been a tremendous surge in the use of compact fluorescent lamps in place of conventional incandescent lamps. Because of longer life and improved energy efficiency provided by the compact fluorescent lamp, consumers as well as commercial establishments have been willing to convert to the compact fluorescent lamps. An example of such a compact fluorescent lamp can be found in U.S. Pat. No. 4,503,360 issued to D. E. Bedel on Mar. 5, 1985, the disclosure of which is expressly incorporated herein in its entirety by reference.

Low-pressure mercury vapor discharge lamps have a maximum efficiency of converting supplied electrical energy into ultraviolet radiation at an optimal mercury vapor pressure. The mercury vapor pressure is typically very highly dependent on the operating temperature of the lamp. Compact fluorescent lamps, which have bent tubes forming convoluted discharge paths, typically have high loads at the walls and therefore high temperatures are reached at the walls during operation of the lamp, typically about 70 to about 140 degrees Centigrade (C.). At these high temperatures the vapor pressure of the mercury can increase above the optimal.

To control the mercury vapor pressure near the optimal level, an amalgam is used in place of conventional liquid mercury. As the mercury vapor pressure in the lamp increases to an undesirable level, the amalgam begins to melt and form a solution with mercury vapor to decrease the mercury vapor pressure in the lamp back toward the optimal level. The location of the amalgam, which has a predetermined melting temperature, is important in providing the desired improvement because the location of the amalgam affects its temperature during operation of the lamp. The amalgam typically used in areas near high temperature walls is bismuth-indium-mercury (Bi-In-Hg).

Lamps using an amalgam optimized for use in high temperature areas have the disadvantage of a longer warm-up or starting period than lamps using pure liquid mercury. The length of the starting period is dependent on the speed at which the mercury vapor pressure in the lamp increases because the lumen output of the lamp is dependent on the mercury vapor pressure in the lamp. The starting period is longer for amalgam containing lamps because the mercury vapor pressure is too low at lower temperatures usually present at start-up, typically in the range of about 0 degrees C. to about 50 degrees C. The mercury vapor pressure increases slowly and doesn't reach its proper level until the amalgam reaches the high temperatures. In contrast, the mercury vapor pressure of a liquid mercury dosed lamp is much higher than the mercury vapor pressure of the amalgam containing lamp at the lower temperatures or at room temperature.

To improve warm-up characteristics of an amalgam containing lamp, an auxiliary amalgam is typically attached to each electrode stem so that the auxiliary amalgam emits mercury during the starting period. The auxiliary amalgam is heated by the cathode after ignition and emits mercury vapor to make up for the lack of mercury vapor during the starting period. The auxiliary amalgam typically used is indium-mercury (In-Hg). The amalgam which controls the mercury vapor pressure during operation, except for the starting period, is typically called the main amalgam, in contrast with the auxiliary amalgam which controls the mercury vapor pressure during the starting period.

Although the above described amalgam containing low-pressure mercury vapor discharge lamps have been employed with varying degrees of success, it has been found that the lamps continue to have a relatively long warm-up or starting period. Accordingly, there is a need in the art for an improved low-pressure mercury vapor discharge lamp having improved warm-up characteristics.

SUMMARY OF THE INVENTION

The present invention provides an amalgam containing low-pressure mercury vapor discharge lamp which overcomes the above noted problems. The low-pressure mercury vapor discharge lamp according to the invention includes a sealed envelope having an interior surface forming an interior space. A phosphor coating is disposed on at least a portion of the interior surface of the envelope. A fill gas including mercury vapor is disposed within the interior space and is energizable to a discharge state. A pair of electrodes are provided in the envelope and have a discharge path therebetween. A main amalgam is located in the sealed envelope and is spaced from the electrodes. The main amalgam controls mercury vapor pressure in the envelope during a discharge period except for a starting period thereof. Auxiliary amalgams are provided in the sealed envelope at each of the electrodes. The auxiliary amalgam emits mercury vapor during the starting period to increase the mercury vapor pressure in the envelope and thereby improve warm-up characteristics of the lamp. An additional auxiliary amalgam is provided in the sealed envelope between the electrodes and in the discharge path. The additional auxiliary amalgam also emits mercury vapor during the starting period assuring that mercury is available along the entire length of the lamp to more quickly increase the mercury vapor pressure in the envelope and thereby further improve the warm-up characteristics of the lamp.

BRIEF DESCRIPTION OF THE DRAWINGS

These and other features and advantages of the present invention will be apparent with reference to the following description taken in conjunction with the accompanying drawings, wherein.

DETAILED DESCRIPTION OF THE PREFERRED EMBODIMENTS

Figure 1:
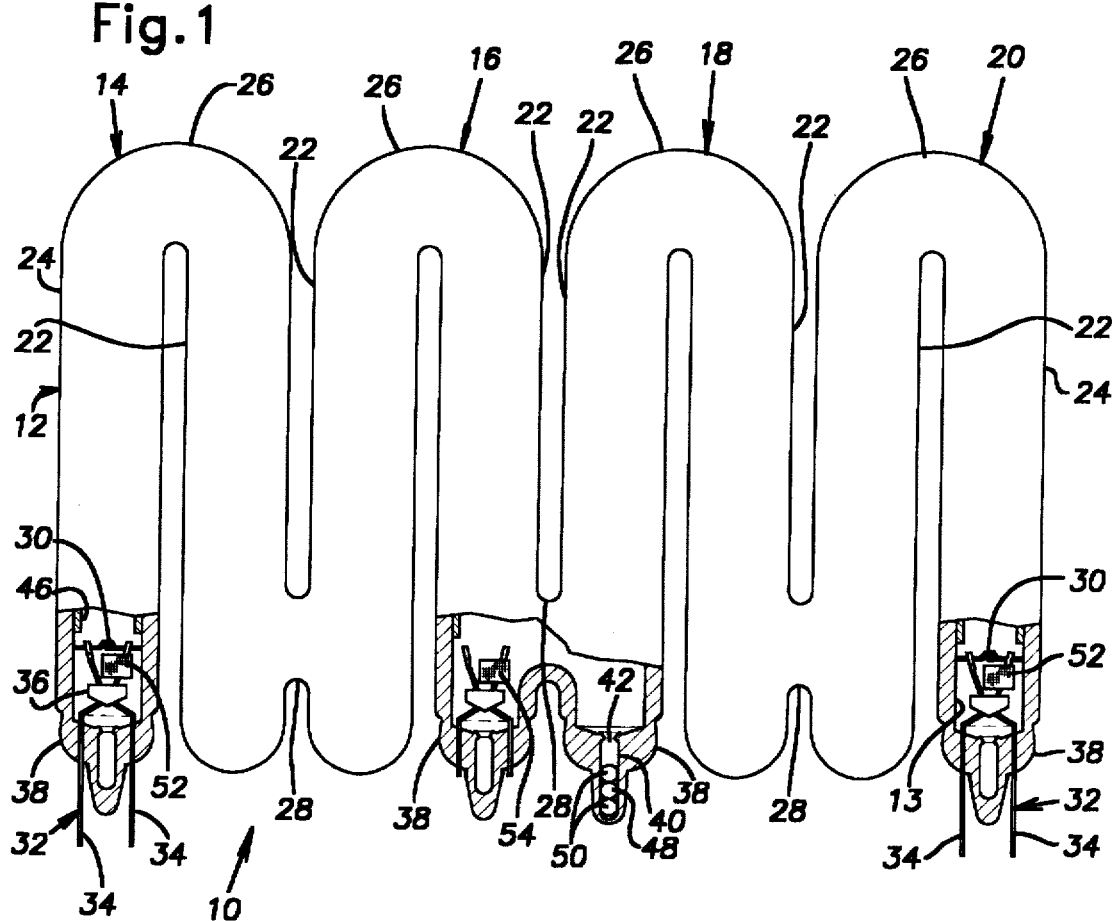
FIG. 1 is an elevational view, in partial cross-section, of a compact fluorescent lamp constructed in accordance with the present invention.

FIG. 1 illustrates a low-pressure mercury vapor discharge lamp or fluorescent lamp 10 in accordance with the present invention. The illustrated lamp 10 is a compact fluorescent lamp which includes a folded or bent, light-transmissive, sealed glass envelope 12. The envelope 12 has an interior surface 13 which forms an interior space. At least a portion of the interior surface 13 of the envelope 12 is provided with a luminescent layer or phosphor coating 46. A gaseous discharge sustaining fill or fill gas is contained within the interior space of the sealed envelope 12. The fill gas typically includes an inert gas such as argon or a mixture of argon and other rare earth gasses at a low pressure in combination with a small quantity of mercury to provide the low vapor pressure manner of operation of the lamp 12.

The envelope 12 of the lamp 10 is formed from four U-shaped tubes 14, 16, 18, 20 having generally circular cross-sections. The tubes 14, 16, 18, 20 each have generally parallel leg sections 22, 24 and a transverse bridging section 26 joining one end of each of the leg sections 22, 24. The opposite end of each of the leg sections 22, 24 is closed.

The tubes 14, 16, 18, 20 are in the same plane and in substantially parallel alignment such that there are two outer tubes 14, 20 and two inner tubes 16, 18. In this configuration there are 2 exterior leg sections 24 and 6 interior leg sections 22. The tubes 14, 16, 18, 20 are oriented in the same direction such that the bridging sections 26 of the tubes 14, 16, 18, 20 are at one end of the lamp 10 while the closed ends of the leg sections 22, 24 are at the opposite end of the lamp 10. Adjacent interior leg sections 22 of adjacent tubes 14, 16, 18, 20, are joined by connecting conduits 28 which complete a convoluted and generally elongate discharge path between cathodes or electrodes 30 which are provided at the closed ends of the exterior leg sections 24 of the outer tubes 14, 20. The transversely extending connecting conduits 28 are spaced from the closed ends of the leg sections 22.

The electrodes 30 are provided at each end of the envelope, that is, the closed ends of the exterior leg sections 24 of the outer tubes 14, 20. The electrodes 30 are of a filament coil type. Each electrode 30 is supported within the envelope 12 by an electrode support structure 32. The electrode support structure 32 includes a pair of electrical lead wires 34 connected to opposite ends of the electrode 30 to supply electrical energy to the electrode 30 and an electrically insulated support bridge 36 connecting and supporting the electrical lead wires 34 below the electrode 30. The electrical lead wires 34 extend through a stem 38 which is pinch sealed to hermetically seal the envelope 12. It is noted the electrodes 30 could alternatively be supported within the envelope 12 by flare sealed type stems as is known in the art.

Figure 2:
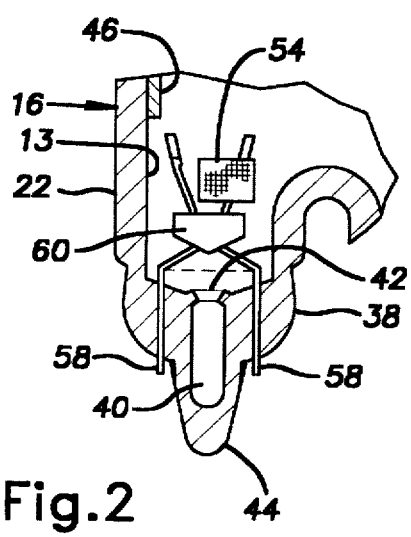
FIG. 2 is an enlarged elevational view, in cross-section, of the auxiliary amalgam stem of the compact fluorescent lamp of FIG. 1.

The closed ends of the adjacent leg sections 22 of the inner tubes 16, 18 are also provided with pinch sealed stems 38. As best seen in FIG. 2, each stem 38 has an exhaust tube or tubulation 40 with a blow hole 42 to provide fluid communication between the interior of the tubulation 40 and the interior of the envelope 12. The tubulation 40 also has a closed-off or tipped end 44 opposite the blow hole 42.

A main amalgam member 48 is provided within the sealed envelope 12 such that it is sufficiently exposed for contacting the fill gas. The term amalgam is used to refer to a material which is capable of absorbing mercury vapor from the fill gas. Typically the amalgam is a metal alloy such as an alloy containing bismuth and indium. The composition of the amalgam is chosen to be compatible with the operating temperature characteristics of the precise position where it is located in the envelope 12. Such an alloy is generally ductile at temperatures of about 100 degrees C. and may become liquid at higher lamp operating temperatures. The purpose of the main amalgam member 48 is to stabilize the mercury vapor pressure at relatively high temperatures to which the mercury vapor pressure undesirably increases during operation of the lamp by absorbing mercury vapor.

The main amalgam member 48 is in the form of a ball or pellet and is located within the tubulation 40 of the pinch sealed stem 38 of one of the inner tubes 18. The tubulation 40 is positioned at a normally lower temperature location, or cool-spot, which is spaced from the electrodes 30 a sufficient distance to be not affected by the high temperatures generated by the electrodes 30 and also spaced from the discharge path. The tubulation 40 has one end in communication with the fill gas through the blow hole 42. Therefore, the main amalgam member 48 is not directly in the discharge path but is accessible to the interior space of the envelope 12 and therefore is exposed to the fill gas.

Means are provided for preventing the main amalgam member 48 from falling into the lamp envelope 12 through the tubulation blow hole 42. Typically, a glass rod 50 is inserted in the tubulation 40 on each side of the main amalgam member 48 and is sized such that it will not pass through the tubulation blow hole 42.

Auxiliary amalgam members 52 are provided within the sealed envelope 12 near the electrodes 30. The auxiliary amalgam members 52 are attached to and supported by one of the lead wires 34 of the electrode support structure 32 adjacent to the electrode 30. Therefore, the auxiliary amalgam members 52 are not directly in the discharge path but are sufficiently near the electrodes 30 such that they are heated by the electrodes during discharge periods. Each amalgam member 52 includes auxiliary amalgam and a wire mesh strip into which the amalgam is embedded. The composition of the auxiliary amalgam is chosen to be compatible with the temperature characteristics of the precise position where it is located in the envelope 12. It is noted that the auxiliary amalgam members 52 could alternatively be of other known types such as, for example, a nickel leaf with the auxiliary amalgam coated on the leaf.

The purpose of the auxiliary amalgam members 50 is to control the mercury vapor pressure during a warm-up or starting period of the lamp. The auxiliary amalgam members 52 are heated by the electrodes 30 and emit mercury vapor during the starting period to increase the mercury vapor pressure and thereby improve warm-up characteristics of the lamp 10. The auxiliary amalgam members 52 also absorb mercury vapor during non-discharge periods.

An additional auxiliary amalgam member 54 is provided within the sealed envelope 12 in the discharge path and spaced from the electrodes 30 a sufficient distance to be not affected by the high temperatures generated by the electrodes 30. The additional auxiliary amalgam 54 is located near the pinch sealed stem 38 of interior leg section 22 of the inner tube 16 adjacent the interior leg section 22 of the inner tube 18 containing the main amalgam 48. As best seen in FIG. 2, the additional auxiliary amalgam member 54 is attached to a support structure 56 which includes a pair of lead wires 58 and an support bridge 60 connecting and supporting the lead wires 58. The lead wires 58 extend through the pinch sealed stem 38 which hermetically seals the envelope 12. The support structure 56 is the same as the electrode support structures 32 with the exception that an electrode 30 is not attached to the lead wires 58 and the lead wires 58 are not connected to the electrical circuit. The additional auxiliary amalgam member 52 is attached to and supported by one of the lead wires 58 in a similar manner as the auxiliary amalgam members 52. Therefore, the additional auxiliary amalgam member 54 is located directly in the discharge path generally at the center of the discharge path, that is, located a substantially equal distance between the pair of electrodes as shown in FIG. 1.

The additional amalgam member 54 is preferably constructed in the same manner as the auxiliary amalgam members 52 and includes auxiliary amalgam and a wire mesh strip into which the amalgam is embedded. The composition of the amalgam is chosen to be compatible with the temperature characteristics of the precise position where it is located in the envelope 12.

The purpose of the additional auxiliary amalgam member is the generally the same as the auxiliary amalgam members 50, that is, to control the mercury vapor pressure during the warm-up or starting period of the lamp 10. The additional auxiliary amalgam member 54 is heated by the discharge and emits mercury vapor during the starting period to increase the mercury vapor pressure. The additional auxiliary amalgam member 54 also absorbs mercury vapor during non-discharge periods. Because the additional auxiliary amalgam member 54 is located along the convoluted discharge path between the electrodes 30, the additional mercury vapor which is emitted along the discharge path assures that mercury is rapidly available along the entire length of the lamp. Therefore, the mercury vapor pressure more rapidly and evenly increases along the length of the lamp to further improve the warm-up characteristics of the lamp 10.

It is noted that while the additional auxiliary amalgam member 54 is illustrated in a preferred position, the additional auxiliary amalgam member 54 could alternatively be located at any of the other closed ends of the interior leg sections 22 of the tubes 14, 16, 18, 20 or other points along the convoluted discharge path between the electrodes 30. It is also noted that more than one auxiliary amalgam member 54 could be located along the discharge path between the electrodes within the scope of the present invention.

Although particular embodiments of the invention has been described in detail, it will be understood that the invention is not limited correspondingly in scope, but includes all changes and modifications coming within the spirit and terms of the claims appended hereto.

What is claimed is:

1. A low-pressure mercury vapor discharge lamp comprising:
    a sealed envelope having an interior surface forming an interior space;
    a phosphor coating disposed on at least a portion of said interior surface;
    a fill gas including mercury vapor disposed within said interior space and inergizable to a discharge state;
    a pair of electrodes provided at opposite ends of said envelope and having a discharge path therebetween;
    electrode support structures attached to said electrodes and supporting said electrodes at said opposite ends, said electrode support structure extending from sealed stems at said opposite ends;
    a main amalgam located in said sealed envelope and spaced from said electrodes for controlling mercury vapor pressure in said envelope during a stable discharge period;
    auxiliary amalgams located in said envelope and near said electrodes to be heated by said electrodes for emitting mercury vapor during a starting period;
    an additional auxiliary amalgam located in said sealed envelope between said electrodes and at an intermediate end of said envelope in said discharge path to be heated by the discharge for emitting mercury vapor during said starting period; and
    an amalgam support structure attached to said additional auxiliary amalgam and supporting said additional auxiliary amalgam at said intermediate end, said amalgam support structure extending from a sealed stem at said intermediate end.

2. The low-pressure mercury vapor discharge lamp according to claim 1, wherein said lamp is a compact fluorescent lamp.

3. The low-pressure mercury vapor discharge lamp according to claim 2, wherein said sealed envelope includes U-shaped tubes having a generally circular cross-section, each of said tubes having a pair of substantially parallel leg sections and a transversely extending bridging section joining said leg sections at one end of the lamp, said leg sections being closed at the opposite end of the lamp, adjacent leg sections of adjacent tubes being joined by connecting conduits for completing said discharge path between said pair of electrodes positioned at the closed ends of exterior leg sections.

4. The low-pressure mercury vapor discharge lamp according to claim 3, wherein said sealed envelope includes four of said U-shaped tubes.

5. The low-pressure mercury vapor discharge lamp according to claim 3, wherein said additional auxiliary amalgam is located at the closed end of an interior leg section.

6. The low-pressure mercury vapor discharge lamp according to claim 5, wherein said additional auxiliary amalgam is located a substantially equal distance between said pair of electrodes.

7. The low-pressure mercury vapor discharge lamp according to claim 5, wherein said main amalgam is located in a sealed stem at the closed end of an interior leg section which is adjacent said interior leg section containing said additional auxiliary amalgam.

8. The low-pressure mercury vapor discharge lamp according to claim 5, wherein said auxiliary amalgams are attached to said electrode support structures.

9. The low-pressure mercury vapor discharge lamp according to claim 1, wherein said amalgam support structure includes a pair of lead wires extending through said sealed stem at said intermediate end and a support bridge connecting and supporting the said lead wires.

10. The low-pressure mercury vapor discharge lamp according to claim 9, wherein each of said electrode support structures are substantially the same as said amalgam support structure.

11. The low-pressure mercury vapor discharge lamp according to claim 1, wherein said auxiliary amalgams are attached to said electrode support structures.

12. The low-pressure mercury vapor discharge lamp according to claim 1, wherein said amalgam support structure is substantially the same as said electrode support structures.

13. The low-pressure mercury vapor discharge lamp according to claim 1, wherein said additional auxiliary amalgam is spaced from said electrodes a sufficient distance to not be heated by said electrodes.

14. The low-pressure mercury vapor discharge lamp according to claim 9, wherein said lead wires of said amalgam support structure are not connected to an electrical circuit.

15. The low-pressure mercury vapor discharge lamp according to claim 9, wherein no electrode is connected to said lead wires of said amalgam support structure.

16. The low-pressure mercury vapor discharge lamp according to claim 1, wherein said sealed stem at said intermediate end is sealed with a pinch seal.

17. A compact fluorescent lamp comprising:

an envelope having a plurality of interconnected U-bent tubes forming a convoluted interior space and an interior surface;

a phosphor coating disposed on at least a portion of said interior surface;

a fill gas including mercury vapor disposed within said interior space and inergizable to a discharge state;

a pair of electrodes provided at opposite ends of said envelope and having a convoluted discharge path therebetween;

electrode support structures attached to said electrodes and supporting said electrodes at said opposite ends, each of said electrode support structures including a pair of lead wires extending through a sealed stem and a support bridge connecting and supporting the said lead wires.

a main amalgam located in said sealed envelope and spaced from said electrodes for controlling mercury vapor pressure in said envelope during a stable discharge period;

auxiliary amalgams located in said envelope and attached to said electrode support structures to be heated by said electrodes for emitting mercury vapor during a starting period;

an additional auxiliary amalgam located in said sealed envelope between said electrodes and at an intermediate end of said envelope in said discharge path to be heated by the discharge for emitting mercury vapor during said starting period; and an amalgam support structure attached to said additional auxiliary amalgam and supporting said additional auxiliary amalgam at said intermediate end, wherein said amalgam support structure extends from a sealed stem at said intermediate end and is substantially the same as said electrode support structures.

* * * * *

UNITED STATES PATENT AND TRADEMARK OFFICE
CERTIFICATE OF CORRECTION

PATENT NO. : 5,739,633
DATED : April 14, 1998
INVENTOR(S) : Attila Biro, et al.

It is certified that error appears in the above-indentified patent and that said Letters Patent is hereby corrected as shown below:

On the title page, under [75] Inventors, "Atilla Biro" should be --Attila Biro--.

Signed and Sealed this

Eleventh Day of May, 1999

Q. TODD DICKINSON

*Attest:*

*Attesting Officer*    *Acting Commissioner of Patents and Trademarks*